United States Patent
Yamamoto et al.

(10) Patent No.: US 12,276,984 B2
(45) Date of Patent: Apr. 15, 2025

(54) MOVING BODY CONTROL DEVICE, MOVING BODY CONTROL METHOD, AND NON-TRANSIENT COMPUTER-READABLE RECORDING MEDIUM

(71) Applicant: Honda Motor Co., Ltd., Tokyo (JP)

(72) Inventors: Sachiko Yamamoto, Saitama (JP);
Shinichiro Kobashi, Saitama (JP);
Misato Echizenya, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 17/982,478

(22) Filed: Nov. 7, 2022

(65) Prior Publication Data
US 2023/0168680 A1 Jun. 1, 2023

(30) Foreign Application Priority Data
Nov. 30, 2021 (JP) .................. 2021-194527

(51) Int. Cl.
*B62K 1/00* (2006.01)
*B62K 11/00* (2006.01)
*G05D 1/00* (2006.01)

(52) U.S. Cl.
CPC ............. *G05D 1/0214* (2013.01); *B62K 1/00* (2013.01); *B62K 11/007* (2016.11)

(58) Field of Classification Search
CPC ...... G05D 1/0214; B62K 1/00; B62K 11/007; B62H 1/12
See application file for complete search history.

(56) References Cited

U.S. PATENT DOCUMENTS

| | | | |
|---|---|---|---|
| 2004/0201271 A1* | 10/2004 | Kakinuma | B62H 1/14 303/113.1 |
| 2009/0051136 A1 | 2/2009 | Yamada et al. | |
| 2010/0179749 A1* | 7/2010 | Kajima | B62K 11/007 701/124 |
| 2010/0268446 A1 | 10/2010 | Fuwa et al. | |

(Continued)

FOREIGN PATENT DOCUMENTS

| | | |
|---|---|---|
| JP | 2002236993 | 8/2002 |
| JP | 2004217170 | 8/2004 |

(Continued)

OTHER PUBLICATIONS

"Office Action of Japan Counterpart Application", issued on Jul. 2, 2024, with English translation thereof, pp. 1-10.

*Primary Examiner* — Adam R Mott
*Assistant Examiner* — Sagar KC
(74) *Attorney, Agent, or Firm* — JCIPRNET

(57) ABSTRACT

The disclosure supports accident prevention or evacuation action of a user who is on board a moving body when a disaster occurs. A moving body control device includes: a moving body control part that controls a moving body maintained in a first state or a second state that is more stable than the first state by a balance control mechanism; and an event detection part that detects an occurrence of a predetermined event. The moving body control part stops the moving body from traveling and causes the moving body to change to the second state regardless of a driving operation of the moving body by an occupant of the moving body in a case where the event detection part detects the occurrence of the predetermined event.

20 Claims, 13 Drawing Sheets

(56) References Cited

U.S. PATENT DOCUMENTS

| | | | | |
|---|---|---|---|---|
| 2016/0129957 A1* | 5/2016 | Murakami | ............ | B62K 11/007 |
| | | | | 701/70 |
| 2018/0059670 A1* | 3/2018 | Nilsson | ............ | B60W 30/18163 |
| 2018/0127013 A1* | 5/2018 | Gerhardt | ................ | B62K 23/00 |
| 2018/0143028 A1* | 5/2018 | Choi | .................. | G01C 21/3415 |
| 2018/0252539 A1* | 9/2018 | Yunoki | ................. | B60W 30/10 |
| 2019/0369623 A1* | 12/2019 | Sadakiyo | ................ | H04W 4/90 |
| 2020/0050212 A1* | 2/2020 | Mimura | ............ | B60W 30/0956 |
| 2020/0127888 A1* | 4/2020 | Sugimura | ............. | H04W 76/50 |
| 2023/0115708 A1* | 4/2023 | Xiang | ..................... | G08G 1/16 |
| | | | | 701/23 |

FOREIGN PATENT DOCUMENTS

| | | | | |
|---|---|---|---|---|
| JP | 2005316533 | | 11/2005 | |
| JP | 2007237750 A | * | 9/2007 | ............. B62D 61/00 |
| JP | 2010247723 | | 11/2010 | |
| JP | 2016005932 | | 1/2016 | |
| JP | 2020158076 | | 10/2020 | |
| WO | 2007088944 | | 8/2007 | |
| WO | 2007100148 | | 9/2007 | |
| WO | 2016204037 | | 12/2016 | |

* cited by examiner

MOVING BODY CONTROL DEVICE, MOVING BODY CONTROL METHOD, AND NON-TRANSIENT COMPUTER-READABLE RECORDING MEDIUM

CROSS-REFERENCE TO RELATED APPLICATION

This application claims the priority benefit of Japan application serial no. 2021-194527, filed on Nov. 30, 2021. The entirety of the above-mentioned patent application is hereby incorporated by reference herein and made a part of this specification.

BACKGROUND

Technical Field

The disclosure relates to a moving body control device, a moving body control method, and a non-transient computer-readable recording medium recording a program.

Related Art

Conventionally, a disaster detection and evacuation guidance system has been proposed for the purpose of accurately grasping a disaster situation by a sensor network and flexibly instructing an evacuation route (see, for example, Patent Literature 1).

CITATION LIST

Patent Literature

[Patent Literature 1] Japanese Patent Application Laid-Open No. 2005-316533

However, considering that a disaster may occur even when the user is on board a moving body, it is assumed that the user will panic if a disaster occurs in such a state. In such a situation, even if disaster detection and evacuation guidance are performed by the conventional method, there is a possibility that the user cannot properly prevent an accident at the time of a disaster or perform evacuation action thereafter.

The disclosure has been made in consideration of such circumstances, and provides a moving body control device, a moving body control method, and a non-transient computer-readable recording medium recording a program capable of supporting accident prevention or evacuation action of a user who has boarded a moving body when a disaster occurs.

SUMMARY

The moving body control device, the moving body control method, and the non-transient computer-readable recording medium recording the program according to the disclosure adopt the following configurations.

(1): A moving body control device according to an embodiment of the disclosure includes: a moving body control part that controls a moving body maintained in a first state or a second state that is more stable than the first state by a balance control mechanism; and an event detection part that detects an occurrence of a predetermined event. The moving body control part stops the moving body from traveling and causes the moving body to change to the second state regardless of a driving operation of the moving body by an occupant of the moving body in a case where the event detection part detects the occurrence of the predetermined event.

(13): In a moving body control method according to an embodiment of the disclosure, a computer performs: performing a moving body control process that controls a moving body maintained in a first state or a second state that is more stable than the first state by a balance control mechanism; detecting an occurrence of a predetermined event; and in the moving body control process, stopping the moving body from traveling and causing the moving body to change to the second state regardless of a driving operation of the moving body by an occupant of the moving body in a case where the occurrence of the predetermined event is detected.

(14): A non-transient computer-readable recording medium according to an embodiment of the disclosure records a program that causes a computer to perform: performing a moving body control process that controls a moving body maintained in a first state or a second state that is more stable than the first state by a balance control mechanism; detecting an occurrence of a predetermined event; and in the moving body control process, stopping the moving body from traveling and causing the moving body to change to the second state regardless of a driving operation of the moving body by an occupant of the moving body in a case where the occurrence of the predetermined event is detected.

Figure 1:
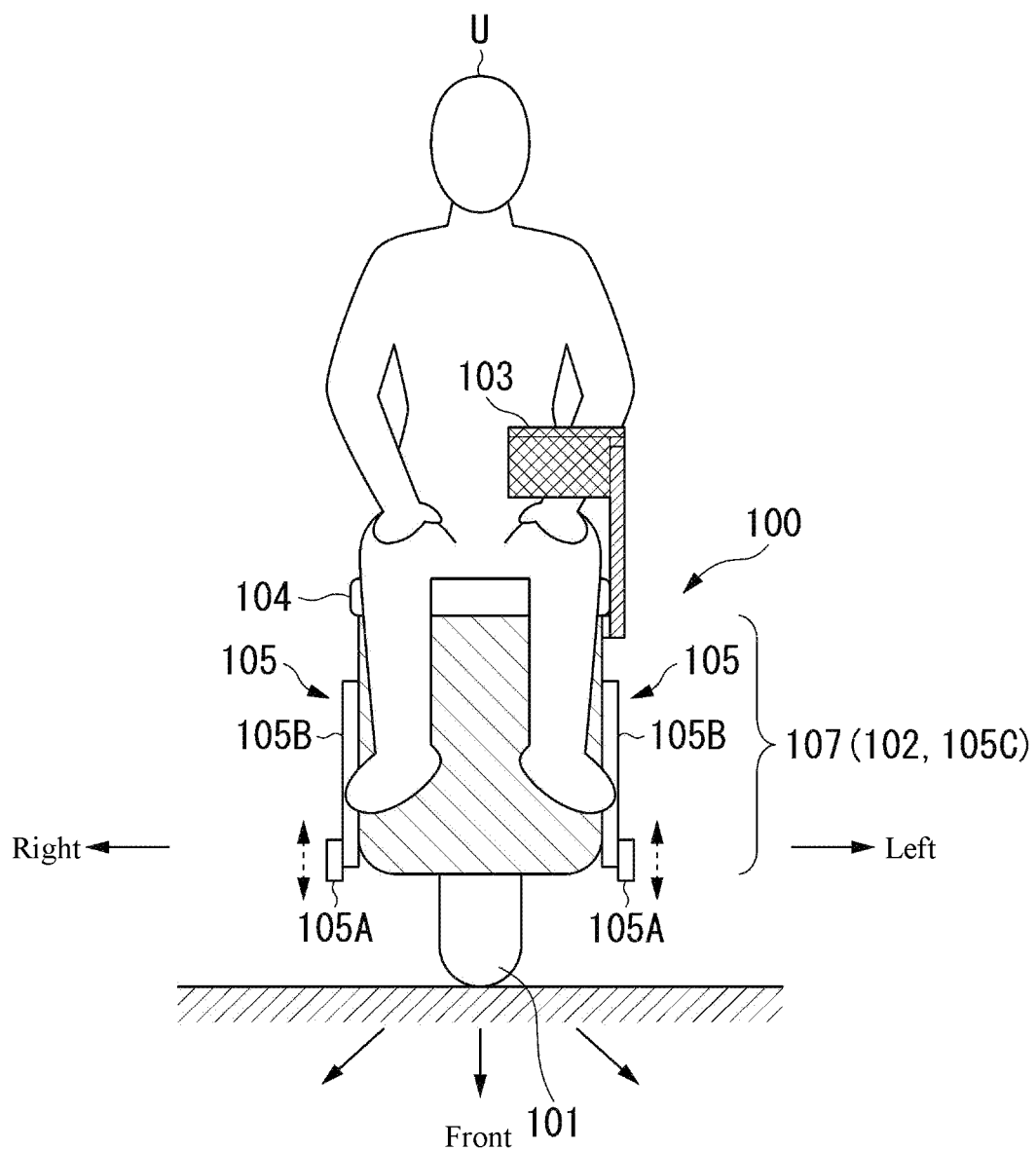
FIG. 1 is a first diagram showing an outline of the appearance of an inverted pendulum type vehicle according to a moving body control system of this embodiment.

DESCRIPTION OF THE EMBODIMENTS (2): In the above aspect (1), the moving body control part determines deceleration of stopping the moving body according to a tilting state of the occupant in the case where the event detection part detects the occurrence of the predetermined event.

(3): In the above aspect (1) or (2), the moving body control part determines a speed of a state change when a state of the moving body is changed to the second state according to a tilting state of the occupant in the case where the event detection part detects the occurrence of the predetermined event.

(4): In any one of the above aspects (1) to (3), the moving body control part has a function of recognizing a surrounding environment of the moving body, and moves the moving body to an end of a road or a place other than the road by automatic driving in a case where the occupant has got off the moving body.

(5): In any one of the above aspects (1) to (4), the event detection part further has a function of detecting an evacuation instruction related to the predetermined event, and the moving body control part makes the moving body automatically move to an evacuation site according to the evacuation instruction in a case where the event detection part detects the evacuation instruction after detecting the occurrence of the predetermined event and the occupant is on board the moving body.

(6): In the above aspect (5), the moving body control part determines a movement route to the evacuation site based on map information of a surrounding area including the evacuation site and position information of the moving body.

(7): In the above aspect (6), the moving body control part estimates a congestion degree in a surrounding environment based on position information of other moving bodies other than the moving body, and determines the movement route based on the congestion degree on a route from a current position to the evacuation site.

(8): In any one of the above aspects (5) to (7), the moving body control part determines a movement route to the evacuation site, including a place that is impassable in normal times when the predetermined event does not occur.

(9): In any one of the above aspects (1) to (8), the moving body control part has a function of detecting an obstacle on a traveling road, and, in a case where an obstacle is detected on a traveling route, changes a state of the moving body to the second state when the moving body passes through a place where the obstacle is detected.

(10): In any one of the above aspects (1) to (9), the moving body further includes a notification part that notifies information to a periphery, and the moving body control part notifies the periphery of the moving body by the notification part that the moving body is performing automatic movement.

(11): In any one of the above aspects (1) to (10), the moving body further includes a support part capable of controlling a landing state and a takeoff state and maintaining an inverted state of the moving body in the landing state, and the moving body control part sets a state in which the support part has taken off as the first state, and the state in which the support part has landed as the second state.

(12): In any one of the above aspects (1) to (10), in the second state, the moving body control part causes the balance control mechanism to ignore the driving operation of the occupant less than or equal to a predetermined amount, or makes a gain of a balance control by the balance control mechanism smaller than a gain in the first state.

According to the above aspects (1) to (14), it is possible to support the accident prevention or evacuation action of the user who has boarded the moving body when a disaster occurs.

Hereinafter, embodiments of a moving body control device, a moving body control method, and a program of the disclosure will be described with reference to the drawings.

Figure 2:
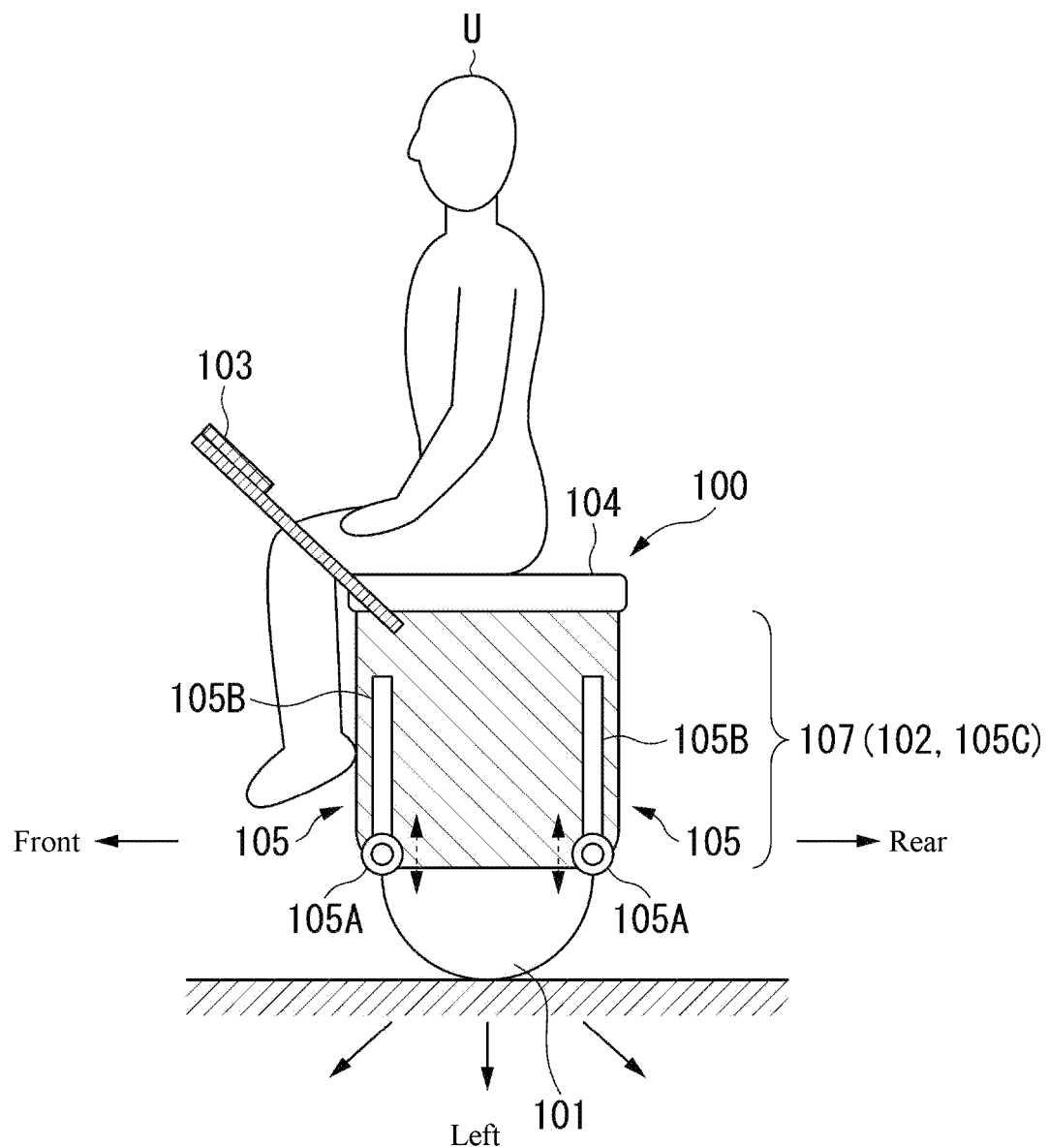
FIG. 2 is a second diagram showing an outline of the appearance of an inverted pendulum type vehicle according to a moving body control system of this embodiment.
Figure 3:
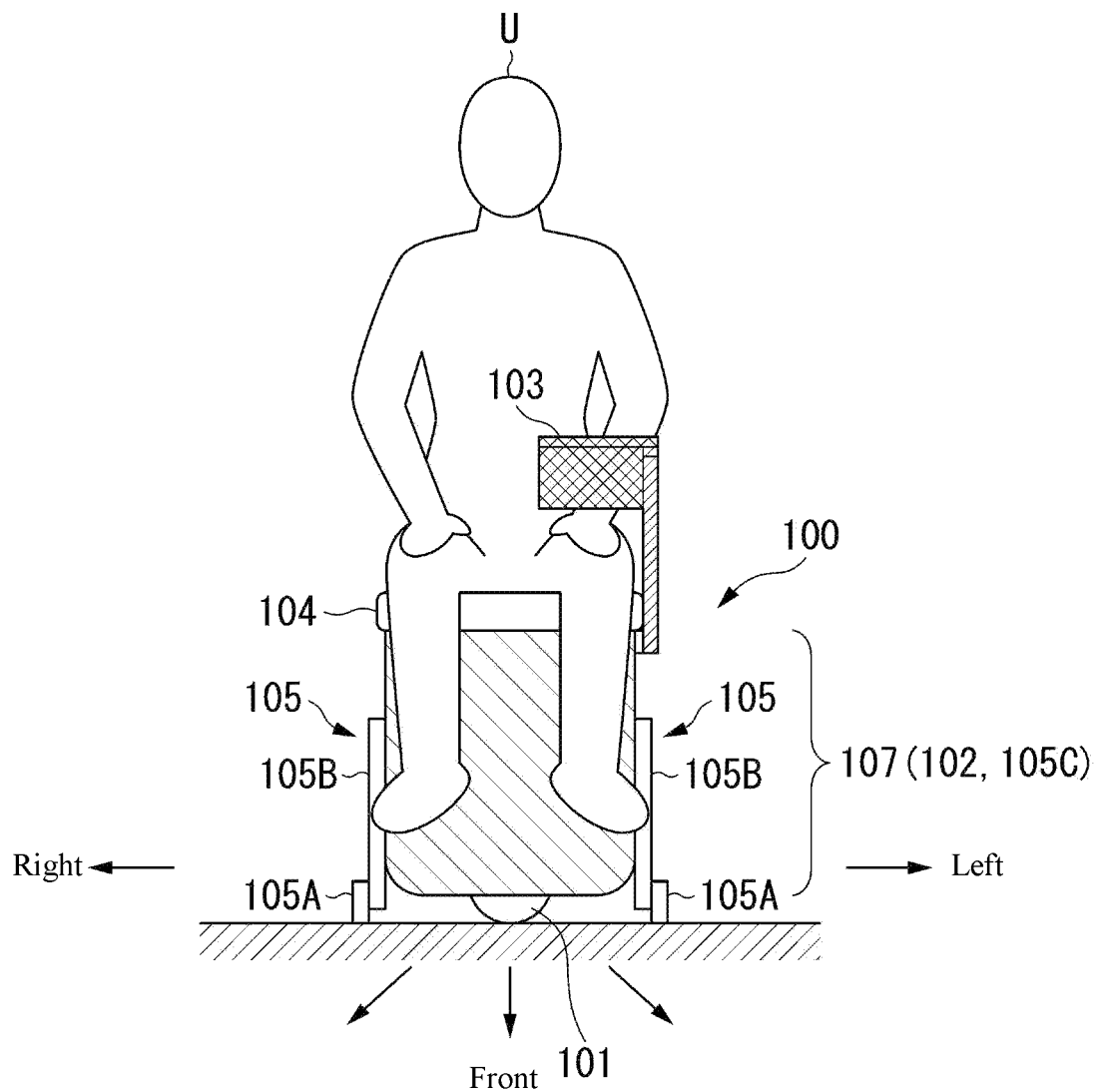
FIG. 3 is a third diagram showing an outline of the appearance of an inverted pendulum type vehicle according to a moving body control system of this embodiment.

FIG. 1 to FIG. 3 are diagrams showing an outline of the appearance of an inverted pendulum type vehicle 100 according to a moving body control system 1 of this embodiment. The moving body control system 1 is a system that guides the inverted pendulum type vehicle 100 to a predetermined destination by controlling the automatic driving of the inverted pendulum type vehicle 100. Here, the inverted pendulum type vehicle 100 is a vehicle configured to be able to move or stop in an inverted state. The inverted state here means a state in which the inverted pendulum type vehicle 100 may stand still or move while balancing the load applied to the upper part of the body with the lower part of the body as a fulcrum. The maintenance of the balance may be maintained by a balance control to be described later, or may be maintained by an inverted auxiliary part 105. FIG. 1 and FIG. 3 show the appearance seen from the front direction, and FIG. 2 shows the appearance seen from the side direction. The inverted pendulum type vehicle 100 is a vehicle in which a boarding part is provided on a base in which a moving mechanism for moving on the floor surface and a drive device for driving the moving mechanism are assembled, and it is a vehicle configured to change the traveling direction in the tilting direction when a user U (occupant) who has boarded the boarding part tilts his or her body with respect to the vertical direction.

The inverted pendulum type vehicle 100 includes, for example, an omnidirectional moving wheel 101 as a moving mechanism, a drive device 102 for driving the omnidirectional moving wheel 101, an operation panel 103, a boarding part 104, the inverted auxiliary part 105, and a base 107 for integrally assembling them. The omnidirectional moving wheel 101 is a wheel that enables the vehicle to immediately advance in any direction (all directions of 360 degrees) from the current position (omnidirectional movement) without performing a preliminary operation such as turning.

The inverted auxiliary part 105 is a mechanism for assisting the inverting of the inverted pendulum type vehicle 100. The inverted auxiliary part 105 is disposed, for example, at the four corners of the front, rear, left, and right of the base 107, and by driving the four inverted auxiliary parts 105 in the vertical direction in conjunction with each other, the inverted pendulum type vehicle 100 may be put into an inverted state in a takeoff state or a landing state. The inverted auxiliary part 105 includes, for example, auxiliary wheels 105A, guide parts 105B, and drive parts 105C (not shown) that drive the auxiliary wheels 105A and the guide parts 105B. The takeoff state is the state in which the auxiliary wheels 105A have taken off, and the landing state is the state in which the auxiliary wheels 105A have landed. Here, the inverted auxiliary part 105 is an example of a "support part."

The auxiliary wheels 105A are wheels that assist the inverting of the inverted pendulum type vehicle 100 in the landing state. The axis of rotation of the auxiliary wheels 105A is connected to the guide parts 105B, and the guide parts 105B move in the vertical direction to contact the ground or take off from the ground. In the landing state, the inverted pendulum type vehicle 100 is supported by the omnidirectional moving wheel 101 and the auxiliary wheels 105A, so that the inverted pendulum type vehicle 100 may maintain the inverted state without requiring the balance control to be described later. Further, the inverted pendulum type vehicle 100 may travel in any direction while receiving the assistance of inverting by the auxiliary wheels 105A by driving the omnidirectional moving wheel 101 in the landing state. In order to facilitate the movement in any direction, the auxiliary wheels 105A may be caster type wheels that may change the direction of the wheels according to the movement of the inverted pendulum type vehicle 100.

The guide parts 105B have a mechanism such as a rail, and are driven in the vertical direction by the drive parts 105C. The guide parts 105B may change the ground contact state of the auxiliary wheels 105A by driving in the vertical direction. For example, by driving the guide parts 105B downward in the takeoff state of FIG. 1, the inverted state of the inverted pendulum type vehicle 100 may be brought into the ground contact state as shown in FIG. 3. On the contrary, by driving the guide parts 105B upward in the ground contact state of FIG. 3, the inverted state of the inverted pendulum type vehicle 100 may be set to the takeoff state as shown in FIG. 1.

It should be noted that FIGS. 1 to 3 show a case where the height of the boarding part 104 differs between the landing state and the takeoff state, but this is because the balance control is not performed in the landing state. In order to further enhance the sense of stability of the balance in the landing state, the height of the boarding part 104 is changed according to the inverted state. Such a configuration is possible, for example, by providing a height adjusting mechanism on the boarding part 104 and operating the height adjusting mechanism in conjunction with the inverted auxiliary part 105. Such a height adjusting function of the boarding part 104 is not necessary, but may be introduced to increase the stability of the landing state.

The drive parts 105C are devices such as motors that supply power to the guide parts 105B. The drive parts 105C are provided inside the base 107, for example, and its operation is controlled by a control part 170, which will be described later. The control part 170 operates the drive part 105C according to an operation input to the operation panel 103 or an instruction from a moving body control device 200, whereby the inverted state of the inverted pendulum type vehicle 100 may be changed to the landing state or the takeoff state.

As described above, FIGS. 1 and 2 show the inverted pendulum type vehicle 100 in the takeoff state. In this state, by the balance control of the omnidirectional moving wheel 101, the inverted state of the inverted pendulum type vehicle 100 is maintained by one point support of the omnidirectional moving wheel 101. Further, FIG. 3 shows the inverted pendulum type vehicle 100 in the landing state. In this state, the inverted state of the inverted pendulum type vehicle 100 is maintained by being supported at five points by the four inverted auxiliary parts 105 and the omnidirectional moving wheel 101. In this way, the inverted pendulum type vehicle 100 is supported at five points in the landing state, whereas the inverted pendulum type vehicle 100 is supported at one point in the takeoff state. Therefore, it may be said that in general, the landing state is a state in which the vehicle may travel more stably than the takeoff state.

Figure 4:
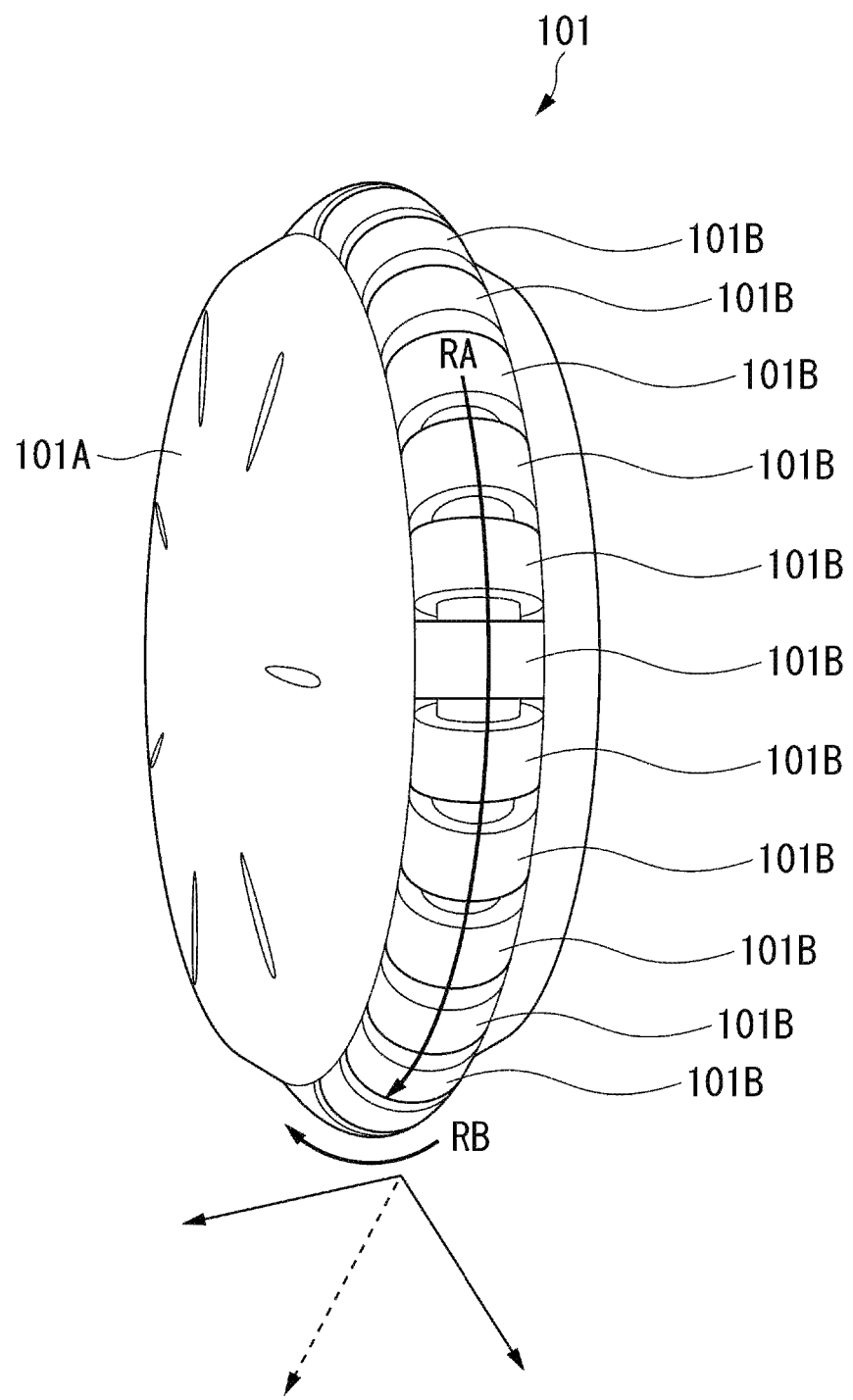
FIG. 4 is a diagram showing an outline of the configuration of the omnidirectional moving wheel.

FIG. 4 is a diagram showing an outline of the configuration of the omnidirectional moving wheel 101. The omnidirectional moving wheel 101 includes, for example, a large diameter wheel 101A and multiple small diameter wheels 101B arranged along the circumference of the large diameter wheel 101A. The large diameter wheel 101A is a wheel that mainly realizes straight-ahead movement in the front-rear direction. The small diameter wheel 101B is a wheel that mainly realizes lateral movement on the spot by rotating in the direction of arrow RB about the rotation direction (circumferential direction; arrow RA) of the large diameter wheel 101A. The omnidirectional moving wheel 101 is driven by a motor (not shown) that may independently control the rotation of the large diameter wheel 101A and the small diameter wheels 101B. With such a configuration, the omnidirectional moving wheel 101 may move forward/backward, left/right, and diagonally in any direction from the spot.

The inverted pendulum type vehicle 100 may be provided with a turning wheel in addition to the omnidirectional moving wheel 101. For example, the turning wheel may be disposed as a rear wheel of the omnidirectional moving wheel 101, and the direction of the inverted pendulum type vehicle 100 may be changed by rotating on a rotation axis orthogonal to the rotation axis of the large diameter wheel 101A. That is, when only the turning wheel is rotated, the inverted pendulum type vehicle 100 is rotated on the spot, and when the large diameter wheel 101A and the turning wheel are rotated at the same time, the inverted pendulum type vehicle 100 may be turned forward while changing its direction in the traveling direction.

Figure 5:
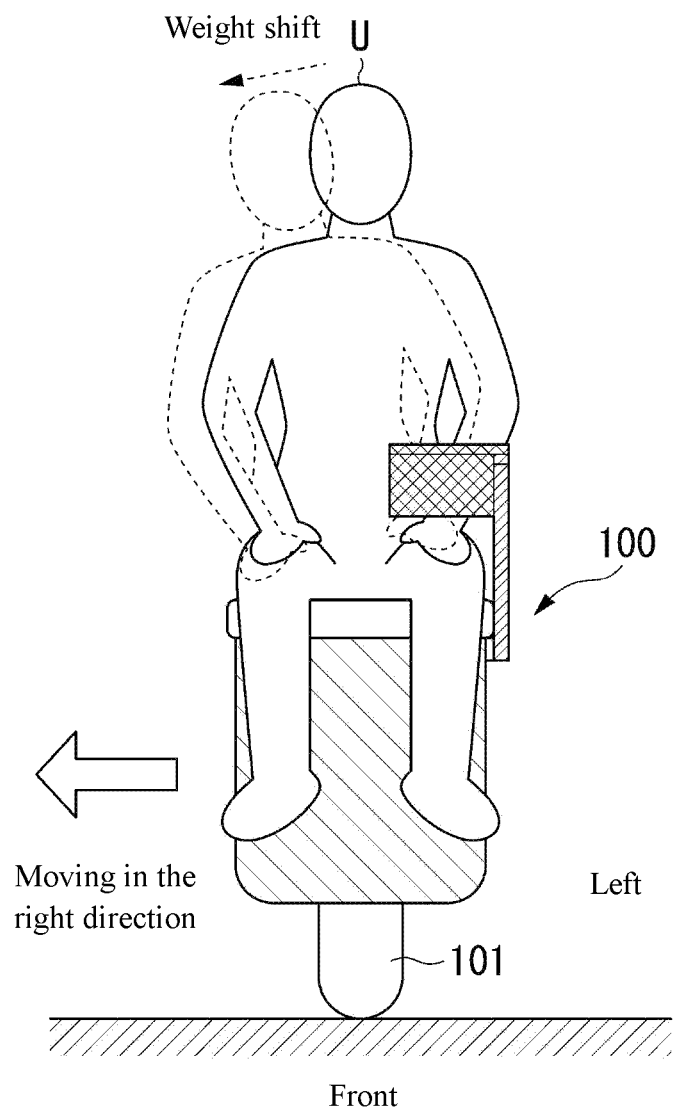
FIG. 5 is a first diagram showing an operation example of the inverted pendulum type vehicle.
Figure 6:
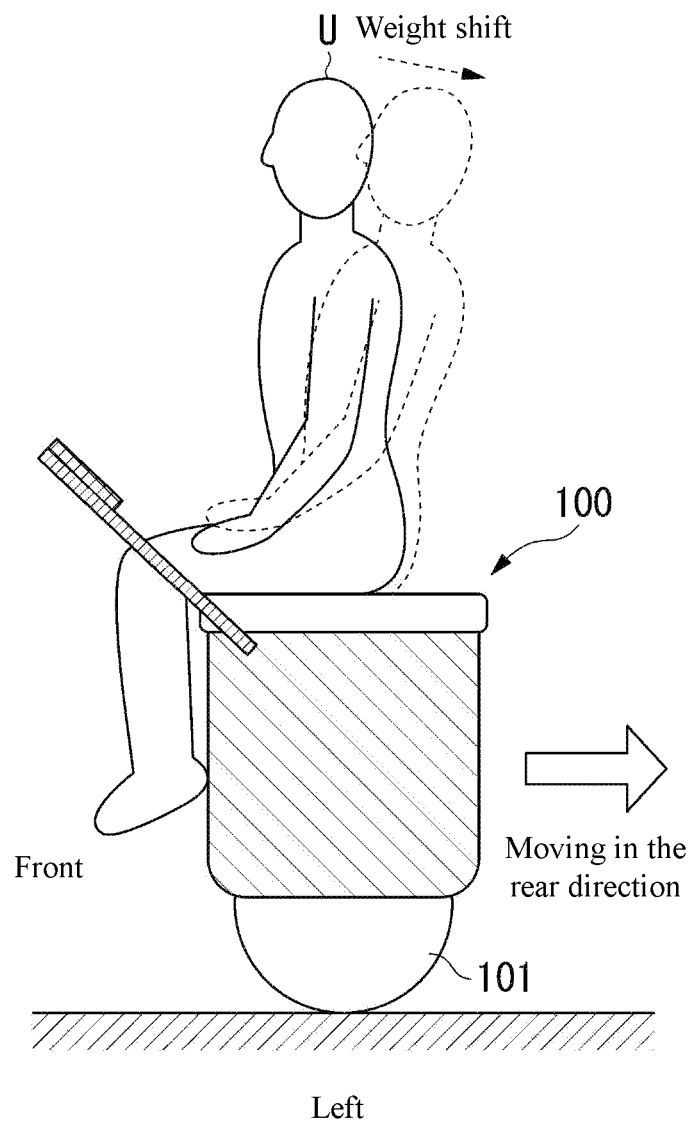
FIG. 6 is a second diagram showing an operation example of the inverted pendulum type vehicle.

FIG. 5 and FIG. 6 are diagrams showing an operation example of the inverted pendulum type vehicle 100. The inverted pendulum type vehicle 100 is equipped with an IMU sensor for detecting the inverted state of the own vehicle, and the inverted pendulum type vehicle 100 is configured to balance the own vehicle based on the detection result of the IMU sensor. FIG. 5 shows a case where the user U shifts his or her weight in the right direction with the front direction of the paper as the front direction with respect to the inverted pendulum type vehicle 100 configured as described above. In this case, the inverted pendulum type vehicle 100 moves to the right in order to restore the balance lost due to the weight shift of the user U. Further, FIG. 6 shows a case where the user U shifts his or her weight in the rear direction (to the right of the paper), and in this case, the inverted pendulum type vehicle 100 moves in the rear direction in order to restore the balance. By performing such balance control, the user U may instruct the moving direction to the inverted pendulum type vehicle 100 by shifting the weight in the direction in which he or she wants to travel. Further, when the user U makes a large weight shift, the inverted pendulum type vehicle 100 is controlled to move faster in order to restore the balance. As a result, the user U may adjust the moving speed of the inverted pendulum type vehicle 100 by changing the magnitude of the weight shift of the user U.

Figure 7:
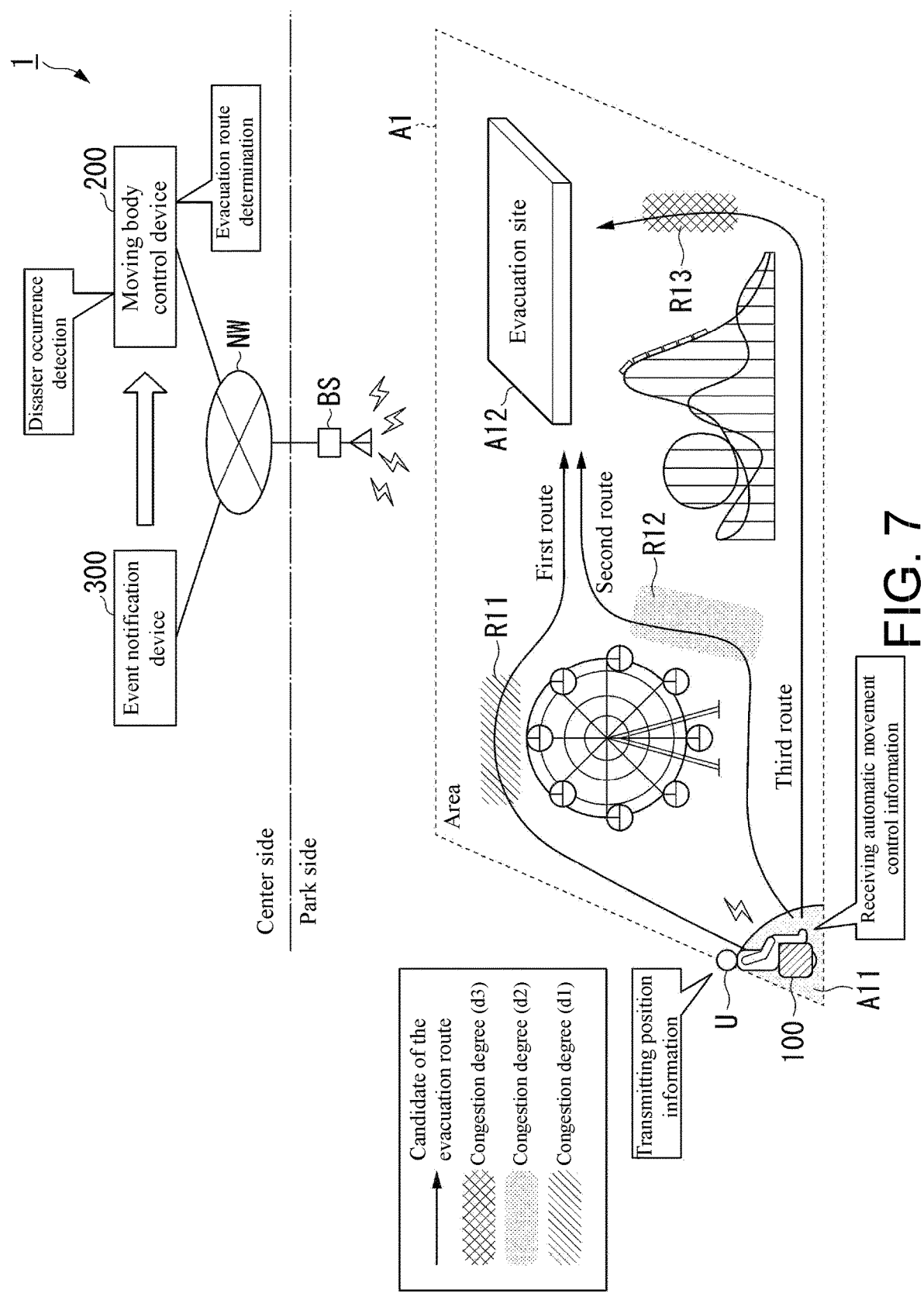
FIG. 7 is a diagram showing an outline of the moving body control system according to this embodiment.

FIG. 7 is a diagram showing an outline of the moving body control system 1 according to this embodiment. For example, the moving body control system 1 is used as a control system for the inverted pendulum type vehicle 100 that provides a user with a means of transportation within a park in a facility such as an amusement park or a theme park (hereinafter, simply referred to as a "park"). The moving body control system 1 includes, for example, the inverted pendulum type vehicle 100, a moving body control device 200, and an event notification device 300. The inverted pendulum type vehicle 100 has a wireless communication function and is connected to a network NW via a wireless base station BS. The inverted pendulum type vehicle 100 may communicate with the moving body control device 200 via the network NW. In addition, the moving body control device 200 and the event notification device 300 are disposed in a data center of the operator of the park and may communicate with the inverted pendulum type vehicle 100 moving in the park via the network NW. The network NW may be a local area network (LAN) or may include a wide area network (WAN).

The moving body control device 200 performs a process for guiding the inverted pendulum type vehicle 100 to a predetermined destination in response to the detection of the occurrence of a predetermined event. In this embodiment, the case where the predetermined event is a disaster and the predetermined destination is an evacuation site in the park will be described, but this is an example, and the predetermined event and the destination are not limited to the disaster and the evacuation site. The moving body control system 1 according to this embodiment may guide the inverted pendulum type vehicle 100 to any destination in response to the detection of the occurrence of any event.

More specifically, the moving body control device 200 moves the inverted pendulum type vehicle 100 toward the evacuation site in the park by automatic driving in response to receiving the notification of the occurrence of a disaster from the event notification device 300. Hereinafter, the movement of the inverted pendulum type vehicle 100 by the automatic driving control of the moving body control device 200 is referred to as "automatic movement." For example, FIG. 7 shows a case where the inverted pendulum type vehicle 100 is guided by automatic movement from the point A11 where it is located at the time when the occurrence of a disaster is detected to the evacuation site A12 in a certain area A1 in the park.

Specifically, the moving body control device 200 wirelessly communicates with the inverted pendulum type vehicle 100 via the wireless base station BS, and acquires the position information of the inverted pendulum type vehicle 100 from the inverted pendulum type vehicle 100. The moving body control device 200 recognizes the current position of the inverted pendulum type vehicle 100 based on the acquired position information, generates control information (hereinafter referred to as "automatic movement control information") for causing the inverted pendulum type vehicle 100 to perform automatic movement based on the recognized current position, and transmits it to the inverted pendulum type vehicle 100. The inverted pendulum type vehicle 100 may reach the evacuation site A12 by controlling the automatic movement of its own vehicle based on the automatic movement control information provided from the moving body control device 200.

The event notification device 300 detects the occurrence of a disaster and notifies the moving body control device 200 to that effect. Hereinafter, this notification is referred to as a disaster notification. The event notification device 300 may have a function of directly detecting a disaster, or may detect the occurrence of a disaster by information distribution from another system. The disaster may be a disaster occurring inside the park or a disaster occurring outside the park.

Figure 8:
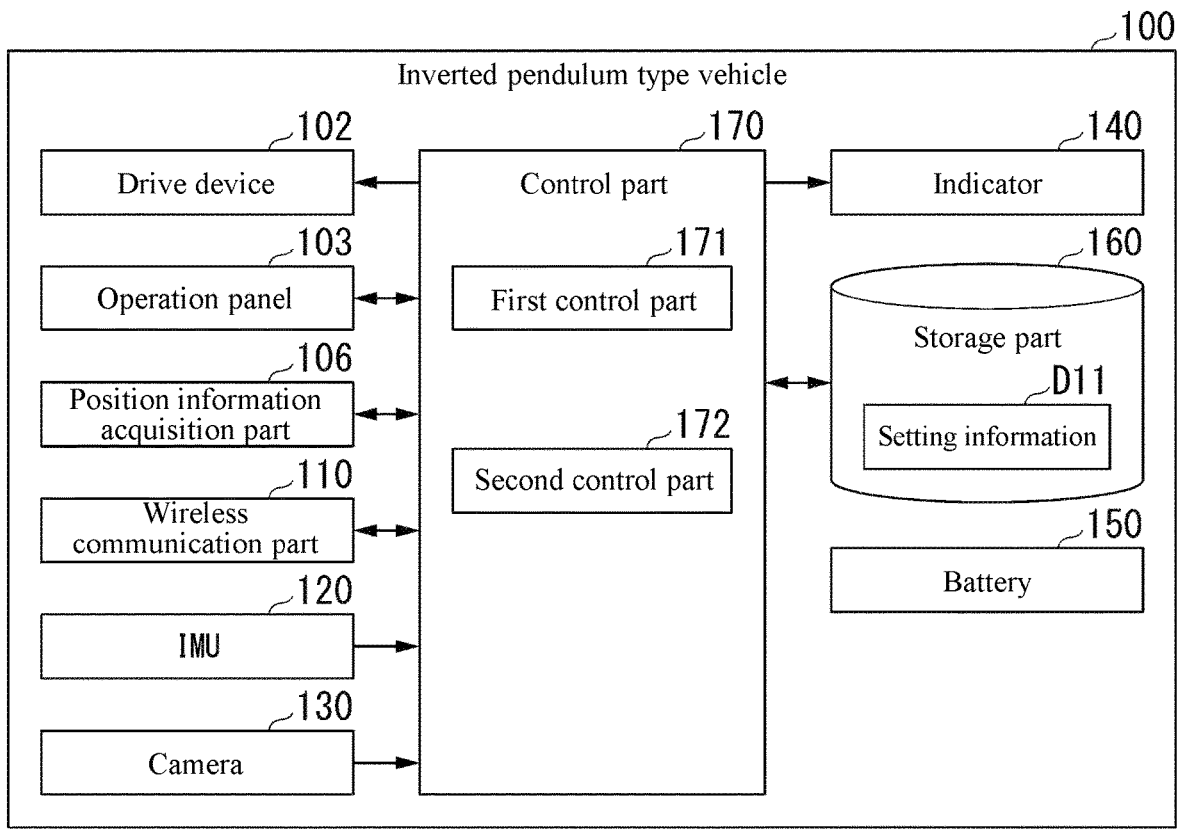
FIG. 8 is a diagram showing an example of a functional configuration of an inverted pendulum type vehicle according to this embodiment.

FIG. 8 is a diagram showing an example of a functional configuration of the inverted pendulum type vehicle 100 according to this embodiment. The inverted pendulum type vehicle 100 includes, for example, a drive device 102, an operation panel 103, a position information acquisition part 106, a wireless communication part 110, an IMU 120, an indicator 140, a battery 150, a storage part 160, and a control part 170. The inverted pendulum type vehicle 100 is realized by, for example, a hardware processor such as a central processing unit (CPU) executing a program (software). In addition, some or all of these components may be realized by hardware (a circuit part, including circuitry) such as a large scale integration (LSI), an application specific integrated circuit (ASIC), a field-programmable gate array (FPGA), a graphics processing unit (GPU) and the like, or may be realized by the cooperation of software and hardware. The program may be stored in advance in a storage device such as the storage part 160 (a storage device including a non-transient storage medium), or may be stored in a removable storage medium such as a DVD or a CD-ROM, and may be installed in the storage part 160 of the inverted pendulum type vehicle 100 or the like by attaching the storage medium (non-transient storage medium) to the drive device.

The drive device 102 and the operation panel 103 are as described above. The drive device 102 drives the omnidirectional moving wheel 101 under the control of the control part 170. The operation panel 103 receives an input operation for the inverted pendulum type vehicle 100 and outputs it to the control part 170, and also outputs information such as image and sound output by the control part 170. The position information acquisition part 106 includes, for example, a global positioning system (GPS) transmitter, acquires the position information of the own vehicle, and provides it to the moving body control device 200.

The wireless communication part 110 is a communication interface for connecting the inverted pendulum type vehicle 100 to the network NW. The wireless communication part 110 communicates with the moving body control device 200 via the network NW. The wireless communication part 110 may be a wireless local area network (LAN) interface based on Wi-Fi (registered trademark), Bluetooth (registered trademark), or the like, or may be a wide area network (WAN) interface connected to a cellular network, a dedicated line, or the like.

The inertial measurement unit (IMU) 120 is a sensor that detects a three-dimensional inertial motion. The IMU 120 includes an acceleration sensor that detects translational motion, a gyro sensor that detects rotational motion, and the like.

A camera 130 captures an image of the vicinity of the inverted pendulum type vehicle 100. In this embodiment, the camera 130 is disposed so as to capture an image of the front of the route in which the inverted pendulum type vehicle 100 moves (basically, the front direction of the base) at least during the automatic movement. The image data captured by the camera 130 is transmitted to the moving body control device 200 via the control part 170.

The indicator 140 is a device such as a sign, a meter, a display, a pointer, an index, and the like, and is a device for indicating decorations related to the state of the inverted pendulum type vehicle 100 and the user U. The indicator 140 is an example of a "notification part."

The battery 150 functions as a power supply for supplying power to each part of the inverted pendulum type vehicle 100. As the battery 150, for example, a rechargeable storage battery such as a lithium ion battery, a nickel hydrogen battery, or a nickel cadmium battery is used. The battery 150 may be fixed to the inverted pendulum type vehicle 100 or may be detachable from the inverted pendulum type vehicle 100.

The storage part 160 is a storage device such as a hard disk drive (HDD), a solid state drive (SSD), a flash memory, or the like. The storage part 160 stores various setting information D11 related to the control of the inverted pendulum type vehicle 100.

The control part 170 controls the operation of the inverted pendulum type vehicle 100. The control part 170 includes, for example, a first control part 171 and a second control part 172. The first control part 171 recognizes the driving operation due to the weight shift of the user U under the balance control based on the detection result of the IMU 120, and controls the operation of the omnidirectional moving wheel 101 so as to move in the direction of the detected weight shift at a speed corresponding to the magnitude of the weight movement. As a result, the user U may operate the inverted pendulum type vehicle 100 by the driving operation as described with reference to FIGS. 5 and 6.

The second control part 172 operates in cooperation with the first control part 171 based on the automatic movement control information received from the moving body control device 200, and controls the automatic movement of the own vehicle so that the own vehicle may reach the evacuation site A12. For example, the second control part 172 receives information indicating a movement direction, a movement speed, a movement target, a direction of the own vehicle, and the like as automatic movement control information for causing the own vehicle to perform automatic movement to the evacuation site A12 from the moving body control device 200. The second control part 172 determines the operation amount required to make the own vehicle travel in the mode notified by the automatic movement control information for each functional part of the own vehicle, and operates each functional part with the determined operation amount, whereby the own vehicle may be made to perform automatic movement.

When the inverted pendulum type vehicle 100 performs automatic movement under the control of the second control part 172, the first control part 171 basically disables the driving operation by the weight shift of the user U. However, as long as automatic movement to the evacuation site is realized, some or all of the driving operations by the weight shift may be enabled.

Figure 9:
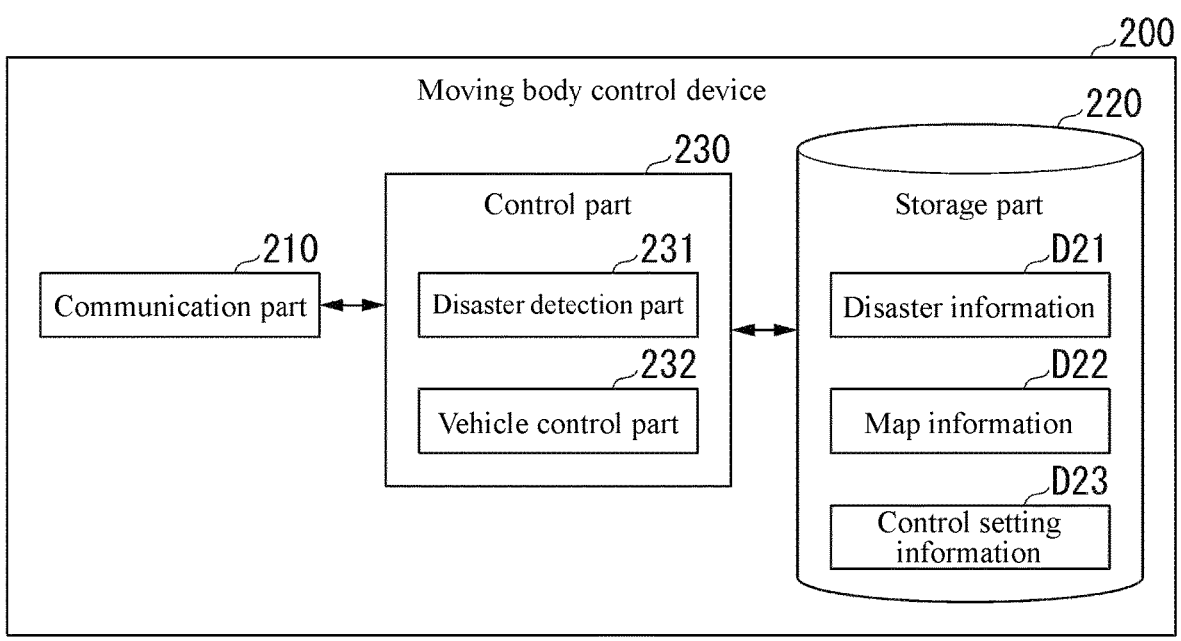
FIG. 9 is a diagram showing an example of a functional configuration of the moving body control device according to this embodiment.

FIG. 9 is a diagram showing an example of a functional configuration of the moving body control device 200 according to this embodiment. The moving body control device 200 includes, for example, a communication part 210, a storage part 220, and a control part 230. The moving body control device 200 is realized by, for example, a hardware processor such as a CPU executing a program (software). In addition, some or all of these components may be realized by hardware (a circuit part, including circuitry) such as a LSI, an ASIC, a FPGA, a GPU and the like, or may be realized by the cooperation of software and hardware. The program may be stored in advance in a storage device such as the storage part 160 (a storage device including a non-transitory storage medium), or may be stored in a removable storage medium such as a DVD or a CD-ROM, and may be installed in the storage part 220 of the moving body control device 200 or the like by attaching the storage medium (non-transient storage medium) to the drive device.

The communication part 210 is a communication interface for connecting the moving body control device 200 to the network NW. The communication part 210 communicates with the inverted pendulum type vehicle 100 and the event notification device 300 via the network NW.

The storage part 220 is a storage device such as a HDD, a SSD, a flash memory, or the like. The storage part 220 stores various information related to the operation of the moving body control device 200. For example, the storage part 220 stores, for each inverted pendulum type vehicle 100, disaster information D21 related to a disaster that has occurred or an evacuation site, map information D22 in the park, control setting information D23 which is setting information related to the automatic movement control, and the like.

The control part 230 performs a process for causing the inverted pendulum type vehicle 100 to perform automatic movement to the destination. The control part 230 includes, for example, a disaster detection part 231 and a vehicle control part 232. Here, the vehicle control part 232 is an example of a "moving body control part."

The disaster detection part 231 detects the occurrence of a disaster by a disaster notification from the event notification device 300. When the disaster detection part 231 receives the disaster notification, the disaster detection part 231 notifies the vehicle control part 232 of the notified content. The disaster notification may be one that notifies only the occurrence of a disaster, or may be one that notifies information such as the place where a disaster occurred, the time when the disaster occurred, and the event that occurred. In addition, the disaster notification may include information related to an evacuation instruction and an evacuation site. In addition, the disaster notification may notify different contents in chronological order. For example, the first disaster notification may notify the occurrence of a disaster, and the second disaster notification may notify an evacuation instruction. In this case, the disaster detection part 231 notifies the vehicle control part 232 of the notified content in chronological order. The disaster detection part 231 is an example of an "event detection part."

The vehicle control part 232 controls the inverted pendulum type vehicle 100 to perform automatic movement to the evacuation site in response to the disaster detection part 231 detecting the occurrence of a disaster. Specifically, the vehicle control part 232 acquires position information from the inverted pendulum type vehicle 100, grasps various positional relationships of the inverted pendulum type vehicles 100 in the park based on the acquired position information, and determines an evacuation route. The vehicle control part 232 may recognize the evacuation site based on the content of the notification from the disaster detection part 231, or may determine the evacuation site according to the disaster that has occurred and the place where the disaster has occurred.

For example, the vehicle control part 232 recognizes the positions of the inverted pendulum type vehicles 100 in the park, and also recognizes the surrounding environment of each inverted pendulum type vehicle 100 based on the map information in the park and the detection information of people, obstacles, and the like in the park. Based on such a recognition result, the vehicle control part 232 is configured to grasp the positional relationship between the inverted pendulum type vehicles 100 and the positional relationship between each inverted pendulum type vehicle 100 and the surrounding environment. The vehicle control part 232 determines the automatic movement route (that is, the evacuation route) of the inverted pendulum type vehicle 100 based on the positional relationship grasped in this way.

For example, the vehicle control part 232 estimates the congestion degree in the park based on various positional relationships grasped for the inverted pendulum type vehicle 100, and selects an evacuation route from the routes in which the congestion degree on the route from the current position to the evacuation site A12 is lower than a threshold value. For example, in the example of FIG. 7, in a situation where a first route, a second route, and a third route exist as candidates of the evacuation route from the point A11 to the evacuation site A12, it shows a case where it is estimated that the regions R11 and R12 on the first route and the second route have congestion degrees d1 and d2 (>d1) lower than the threshold value, respectively, and it is estimated that the region R13 on the third route has a congestion degree higher than the threshold value. In this case, the vehicle control part 232 selects an evacuation route from the first route and the second route whose congestion degree is lower than the threshold value. For example, the vehicle control part 232 determines the first route with the lowest congestion degree as the evacuation route, and controls the movement mode so that the inverted pendulum type vehicle 100 performs automatic movement to the evacuation site A12 through the first route. If the first route is not suitable as the evacuation route due to factors other than the congestion degree, the vehicle control part 232 may determine the second route as the evacuation route. Further, when neither of the first route and the second route are suitable as the evacuation route due to factors other than the congestion degree, the vehicle control part 232 may determine the third route as the evacuation route. In this way, the vehicle control part 232 determines the evacuation route based on the congestion degree on the movement route.

Further, for example, the vehicle control part 232 may be configured to determine a movement route to the evacuation site A12, including a place that is impassable in normal times when a disaster does not occur. In this case, by registering the information of the route (hereinafter referred to as "emergency route") that is impassable in normal times and may be passed when a disaster occurs in the map information D22 in advance, the vehicle control part 232 may determine the evacuation route including such an emergency route.

Further, for example, the vehicle control part 232 may be configured to make the inverted pendulum type vehicle 100 automatically move to an evacuation site when the disaster detection part 231 detects an evacuation instruction after detecting the occurrence of a disaster and an occupant is on board the inverted pendulum type vehicle 100. In this case, the vehicle control part 232 may determine an evacuation site based on the disaster information D21, or if the evacuation instruction specifies an evacuation site, the specified site may be determined as the evacuation site.

Further, for example, when the vehicle control part 232 is guiding the inverted pendulum type vehicle 100 to the evacuation site A12 by automatic movement, it may cause the inverted pendulum type vehicle 100 to perform an operation (peripheral notification) to notify the surroundings that the own vehicle is automatically moving toward the evacuation site A12. For example, the vehicle control part 232 may control the inverted pendulum type vehicle 100 to notify by the display of the indicator 140 that the vehicle is being guided to the evacuation site A12. In addition to the mode of displaying information, the peripheral notification may be realized by a mode of notifying by audio output or a mode of notifying by transmitting information by communication.

Hereinafter, some specific examples of a method of controlling the movement mode of the inverted pendulum type vehicle 100 in which the moving body control device 200 performs automatic movement toward the evacuation site A12 will be described.

Figure 10:
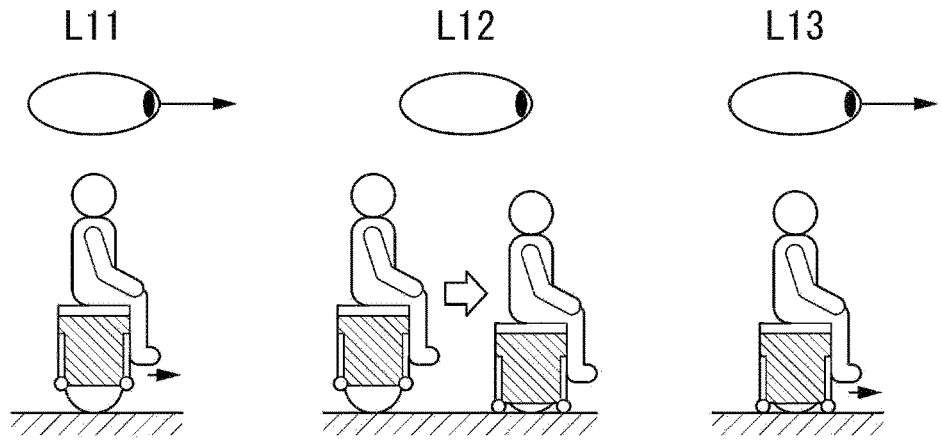
FIG. 10 is a diagram illustrating a first control method for controlling the inverted pendulum type vehicle according to this embodiment.

FIG. 10 is a diagram illustrating a first control method for controlling the inverted pendulum type vehicle 100 according to this embodiment. Specifically, in the first control method, when a disaster is detected, the traveling of the inverted pendulum type vehicle 100 is temporarily stopped, and the state of the inverted pendulum type vehicle 100 is changed to the landing state regardless of the driving operation of the user U (including the operation of the operation panel 103 or the driving operation by weight shift). Specifically, FIG. 10 shows a situation in which a disaster is detected while the inverted pendulum type vehicle 100 is traveling in the traveling direction by the driving operation (weight shift) of the user U at the point L11.

In this case, the vehicle control part 232 starts deceleration at the point L11 in order to temporarily stop the inverted pendulum type vehicle 100 traveling in the takeoff state, and temporarily stops it at the point L12. Then, the vehicle control part 232 changes the inverted pendulum type vehicle 100 from the takeoff state to the landing state after the inverted pendulum type vehicle 100 is temporarily stopped. When the inverted pendulum type vehicle 100 completes the change to the landing state, the vehicle control part 232 causes the inverted pendulum type vehicle 100 to start automatic movement toward the evacuation site A12. FIG. 10 shows a situation in which the inverted pendulum type vehicle 100 performs automatic movement toward the evacuation site A12 at the point L13 after the start of automatic movement.

According to such a first control method, the moving body control system 1 may safely guide the user U to the evacuation site A12 by the inverted pendulum type vehicle 100 in the landing state when a disaster occurs while the user U is using the inverted pendulum type vehicle 100.

Figure 11:
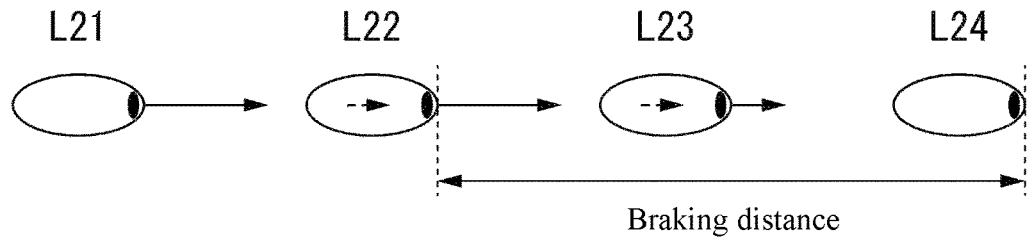
FIG. 11 is a first diagram illustrating a second control method for controlling the inverted pendulum type vehicle according to this embodiment.
Figure 12:
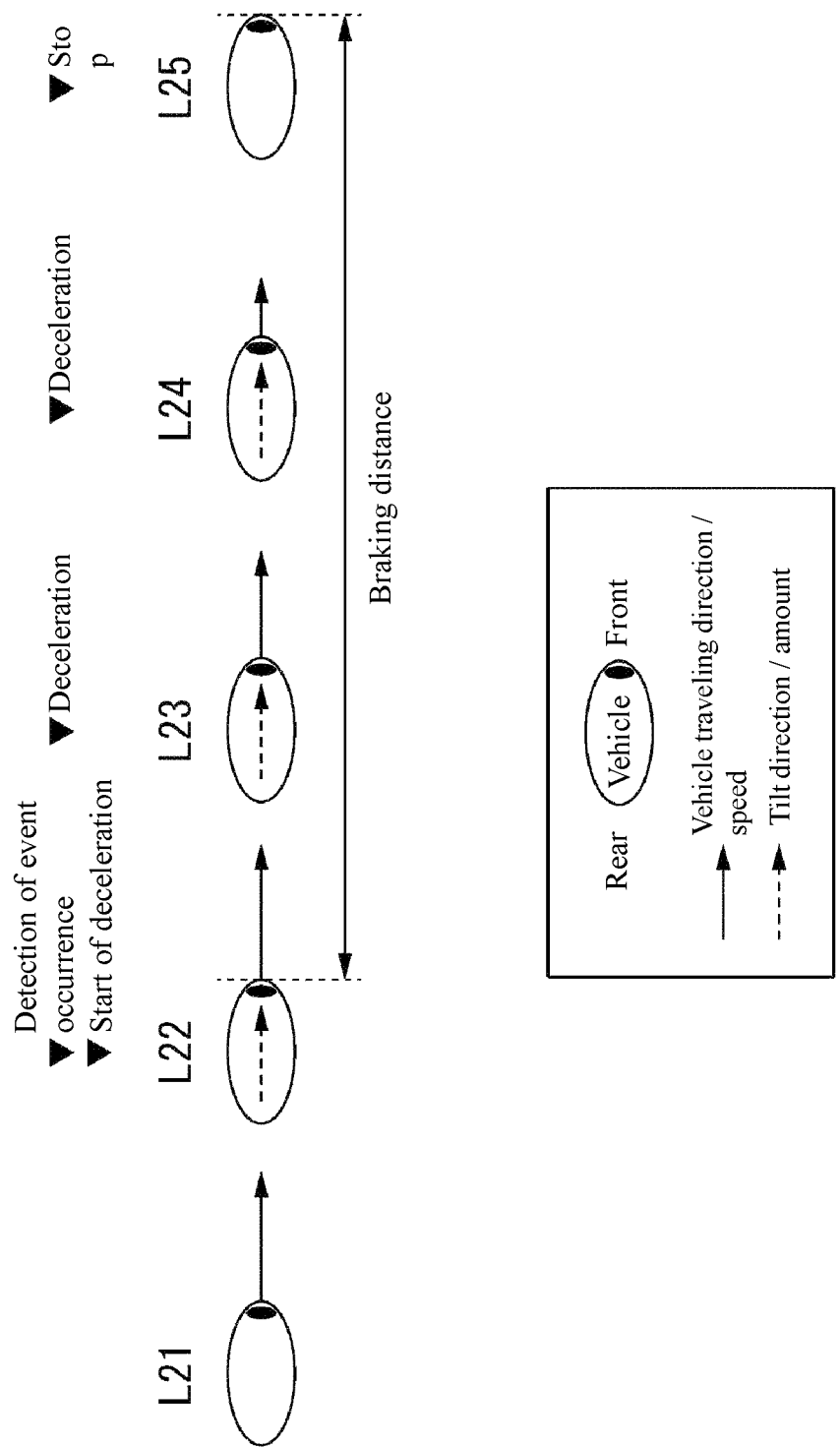
FIG. 12 is a second diagram illustrating the second control method for controlling the inverted pendulum type vehicle according to this embodiment.

FIG. 11 and FIG. 12 are diagrams illustrating a second control method for controlling the inverted pendulum type vehicle 100 according to this embodiment. Specifically, in the second control method, the deceleration when the inverted pendulum type vehicle 100 is temporarily stopped when the occurrence of a disaster is detected is controlled according to the tilt amount (magnitude of weight shift) of the user U. Specifically, FIG. 12 shows an example of deceleration when the tilt amount of the user U is large, and FIG. 11 shows an example of deceleration when the tilt amount of the user U is small. In both cases, it shows a situation in which a disaster has been detected while the inverted pendulum type vehicle 100 is traveling at the point L22 and deceleration has started.

In the case of FIG. 12, since a tilt amount of the user U is large, the vehicle control part 232 controls the inverted pendulum type vehicle 100 so that the temporary stop is performed slowly. In addition, in the case of FIG. 11, since the tilt amount of the user U is smaller than that in the case of FIG. 12, the vehicle control part 232 controls the inverted pendulum type vehicle 100 so that the temporary stop may be performed more quickly than in the case of FIG. 12. As a result, even when deceleration is started at the same timing, the braking distance is longer in the case of FIG. 12 in which the tilt amount of the user U is larger than in the case of FIG. 11. That is, in the second control method, the vehicle control part 232 determines the deceleration when the inverted pendulum type vehicle 100 is temporarily stopped when the occurrence of a disaster is detected according to the tilting state of the user U.

According to such a second control method, in the moving body control system 1, the larger the tilt amount of the user U (for example, when the user U is unconscious and covers the front of the own vehicle, or when the user U leans forward due to the driving operation before the start of deceleration), the more slowly the inverted pendulum type vehicle 100 is decelerated. Therefore, the inverted pendulum type vehicle 100 may be safely temporarily stopped in a way in which the user U is not thrown forward.

Figure 13:
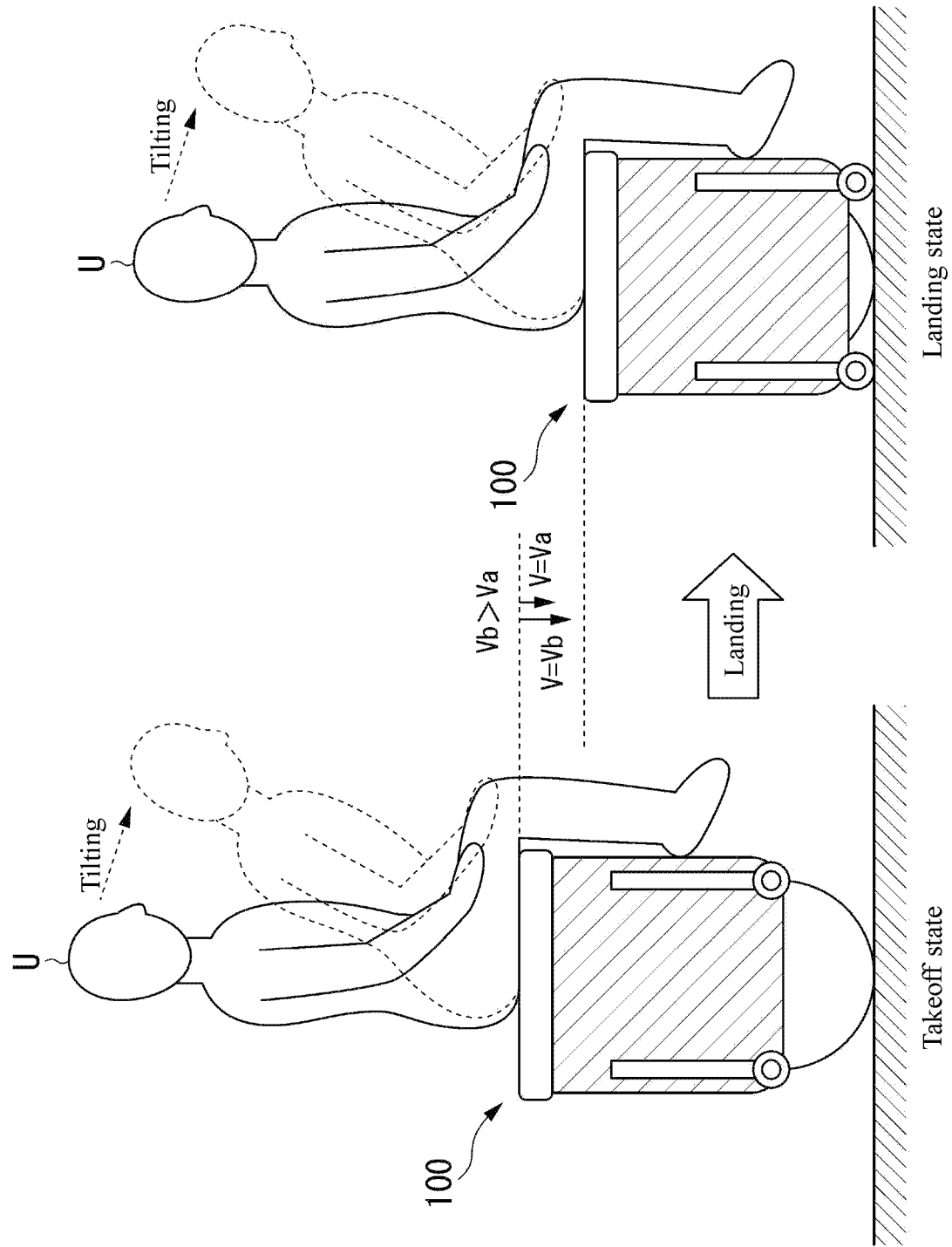
FIG. 13 is a diagram illustrating a third control method for controlling the inverted pendulum type vehicle according to this embodiment.

FIG. 13 is a diagram illustrating a third control method for controlling the inverted pendulum type vehicle 100 according to this embodiment. In the third control method, the speed at which the inverted pendulum type vehicle 100 is temporarily stopped and then the inverted pendulum type vehicle 100 is changed from the takeoff state to the landing state (hereinafter referred to as the "landing speed") is controlled according to the tilt amount of the user U. Specifically, the vehicle control part 232 determines the landing speed V so that the larger the tilt amount of the user U is, the smaller the landing speed V is.

FIG. 13 shows a situation in which the landing speed is controlled so that the landing speed V=Va when the tilt amount of the user U is large is smaller than the landing speed V=Vb when the tilt amount of the user U is small. That is, in this case, the time of changing from the takeoff state to the landing state at the landing speed V=Va (<Vb) is longer than the time of changing from the takeoff state to the landing state at the landing speed V=Vb (>Va). Therefore, the inverted pendulum type vehicle 100 changes from the takeoff state to the landing state more slowly as the tilt amount of the user U is larger.

According to such a third control method, in the moving body control system 1, the larger the tilt amount of the user U (for example, when the user U is unconscious and covers the front of the own vehicle, or when the user U leans forward due to the driving operation before the start of deceleration), the more slowly the inverted pendulum type vehicle 100 is changed from the takeoff state to the landing state. Therefore, the inverted pendulum type vehicle 100 may be safely changed to the landing state in a way in which the user U does not lose the balance and overturn or fall from the inverted pendulum type vehicle 100.

Figure 14:
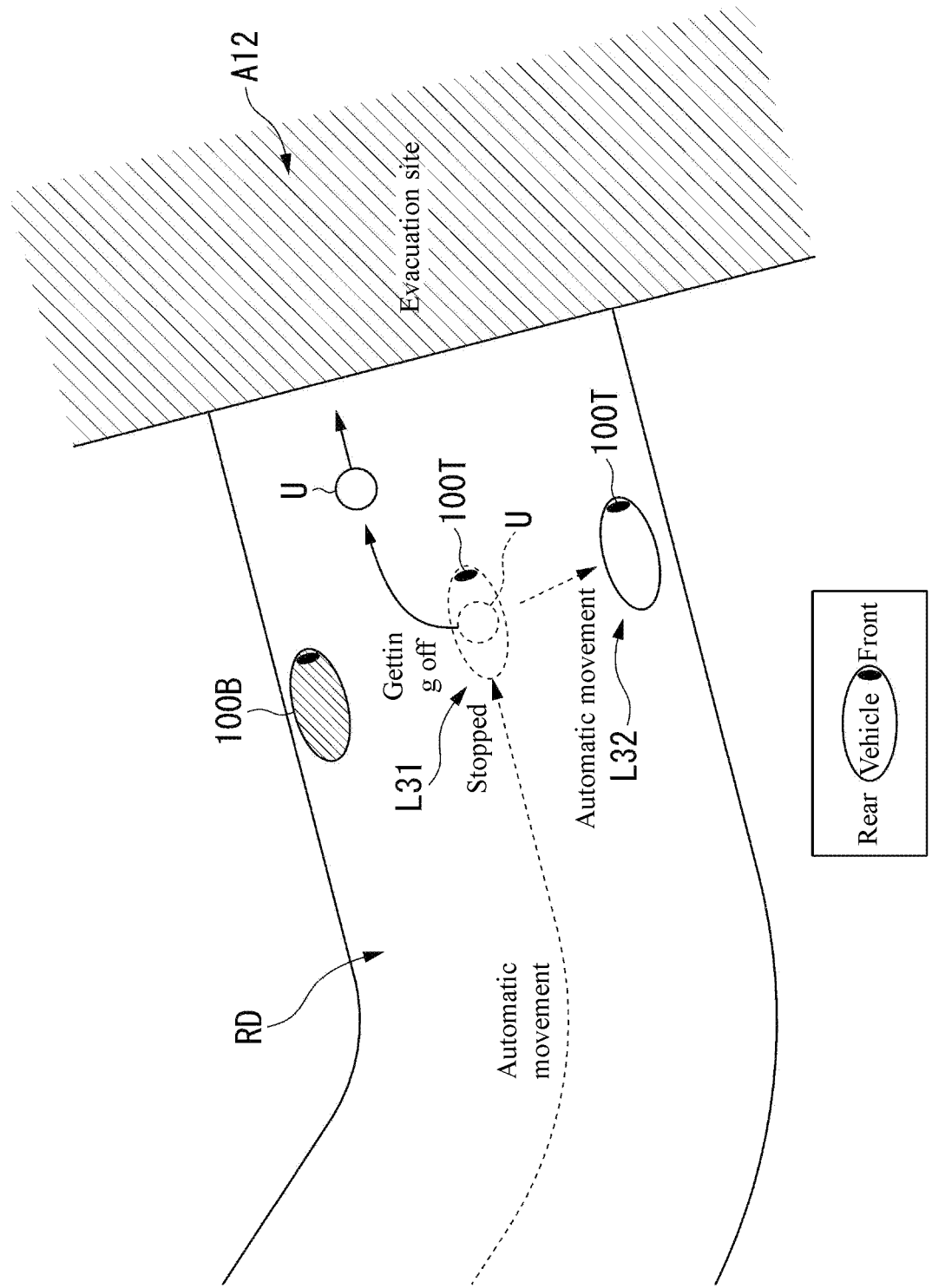
FIG. 14 is a diagram illustrating a fourth control method for controlling the inverted pendulum type vehicle according to this embodiment.

FIG. 14 is a diagram illustrating a fourth control method for controlling the inverted pendulum type vehicle 100 according to this embodiment. The fourth control method is to move the user U to a place that does not obstruct the passage of the inverted pendulum type vehicle 100 by automatic driving when the user U gets off the inverted pendulum type vehicle 100. Specifically, the vehicle control part 232 recognizes the surrounding environment of a target inverted pendulum type vehicle 100 based on the map information in the park, the position information of other inverted pendulum type vehicles 100, and the like, and determines a place that does not obstruct the passage as a destination, and moves the inverted pendulum type vehicle 100 to the destination by automatic driving.

FIG. 14 shows a situation in which the inverted pendulum type vehicle 100T arrives at the point L31 near the destination evacuation site A12 by automatic movement and stops, and then the user U gets off and is about to enter the evacuation site A12 on foot. In this case, the vehicle control part 232 determines the point L32 as the stop location of the inverted pendulum type vehicle 100T as a result of recognizing the position and shape of the passage RD, the position of another inverted pendulum type vehicle 100B, and the like. The vehicle control part 232 controls the automatic operation of the inverted pendulum type vehicle 100T so as to automatically move to the point L32 determined as the stop location.

According to such a fourth control method, the moving body control system 1 may automatically move the inverted pendulum type vehicle 100 to a place that does not obstruct the passage after the user U gets off. Therefore, it is possible to prevent the evacuation action of the inverted pendulum type vehicle 100 by automatic movement from interfering with the evacuation action of another inverted pendulum type vehicle 100 or another person.

Here, the case where the user U gets off the inverted pendulum type vehicle 100 on the road and moves the inverted pendulum type vehicle 100 to the end of the road has been described, but the stop location of the inverted pendulum type vehicle 100 may be any place in addition to the end of the road as long as it does not obstruct the passage.

Figure 15:
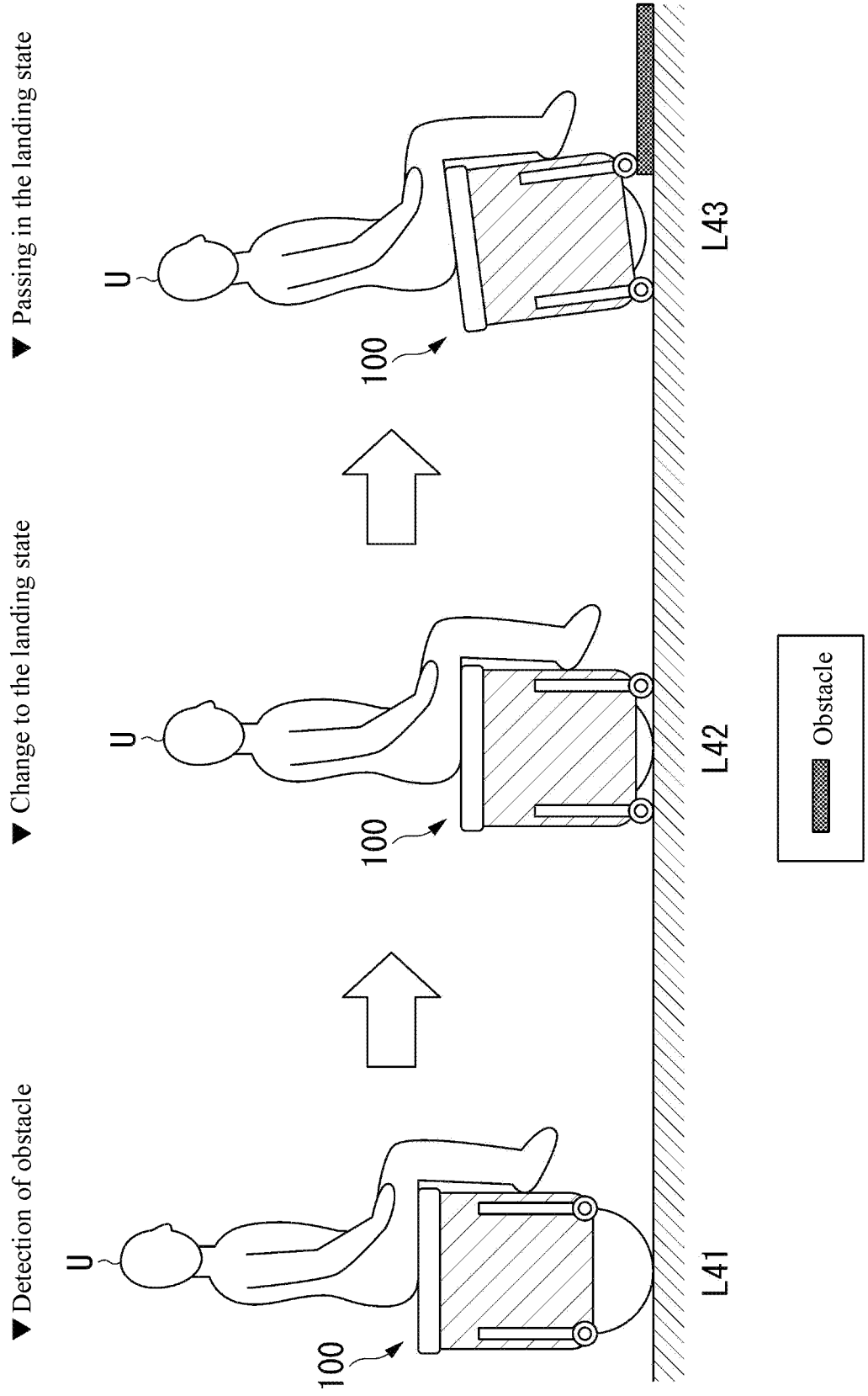
FIG. 15 is a diagram illustrating a fifth control method for controlling the inverted pendulum type vehicle according to this embodiment.

FIG. 15 is a diagram illustrating a fifth control method for controlling the inverted pendulum type vehicle 100 according to this embodiment. The fifth control method is to change the inverted pendulum type vehicle 100 to a second inverted state when an obstacle is detected on the traveling route of the inverted pendulum type vehicle 100 and when it passes through a place where the obstacle is detected. Specifically, the second control part 172 of the inverted pendulum type vehicle 100 captures an image of the front of the own vehicle that is traveling by the camera 130, and transmits the captured image data to the moving body control device 200. In this case, the vehicle control part 232 tries to detect an obstacle existing on the traveling route of the inverted pendulum type vehicle 100 by the object recognition process based on the received image data. When an obstacle is detected on the traveling route of the inverted pendulum type vehicle 100, the vehicle control part 232 changes the inverted pendulum type vehicle 100 to the landing state in order to pass the place where the obstacle is detected in the landing state in which the inverted state is stable.

FIG. 15 shows a situation in which the vehicle control part 232 detects an obstacle in front and starts changing the inverted pendulum type vehicle 100 to the landing state when the inverted pendulum type vehicle 100 is traveling at the point L41 in the takeoff state. In this case, the vehicle control part 232 changes the inverted pendulum type vehicle 100 from the takeoff state to the landing state so that the change to the landing state is completed by the time the inverted pendulum type vehicle 100 reaches the obstacle in front. For example, the vehicle control part 232 may temporarily stop the inverted pendulum type vehicle 100 for the state change, or may adjust the landing speed so that the change to the landing state is completed by the time the inverted pendulum type vehicle 100 reaches the obstacle in front.

According to such a fifth control method, the moving body control system 1 may make the inverted pendulum type vehicle 100 travel in the landing state when an obstacle exists on the evacuation route, so that the User U may be guided to the evacuation site A12 more safely.

Note that FIG. 15 shows a situation in which the inverted pendulum type vehicle 100 that has changed to the landing state overcomes an obstacle, but this is an example, and if possible, the inverted pendulum type vehicle 100 may be controlled so as to avoid the detected obstacles and travel.

The moving body control system 1 of the embodiment configured in this way may support the user on board the inverted pendulum type vehicle 100 to appropriately execute accident prevention or evacuation action when a disaster occurs.

In the above embodiment, when a predetermined event such as a disaster is detected, the case where the moving body control device 200 stops the inverted pendulum type vehicle 100 and changes it to the landing state regardless of the driving operation of the occupant has been described. In this case, as another control mode, the moving body control device 200 may be configured to maintain the takeoff state without changing the inverted pendulum type vehicle 100 to the landing state when a predetermined event is detected. In this case, if the occupant is not stationary, the vehicle body sways due to the balance control. Therefore, in order to suppress such sway, the moving body control device 200 may be configured to ignore the weight shift of the occupant below a predetermined amount in the balance control, or to make the gain of the balance control smaller than that before the detection of the predetermined event. That is, in this case, the takeoff state when the predetermined event is not detected is an example of the "first state," and the takeoff state when the predetermined event is detected is an example of the "second state."

In the above embodiment, the moving body control system 1 for controlling the automatic movement mode of the inverted pendulum type vehicle 100 traveling in the takeoff state or the landing state has been described, but the control target of the moving body control system 1 is not necessarily limited to the inverted pendulum type vehicle 100. The control target of the moving body control system 1 may be any moving body as long as it travels in a first state or a second state that is more stable than the first state. That is, the moving body control system 1 of this embodiment may be applied to a moving body that moves in an inverted state, and may also be applied to a moving body that moves in a state other than the inverted state.

In the above embodiment, the moving body control system 1 in which the inverted pendulum type vehicle 100 and the moving body control device 200 for controlling the inverted pendulum type vehicle 100 are separately configured has been described. However, in the moving body control system 1, the inverted pendulum type vehicle 100 and the moving body control device 200 may be integrally configured. In this case, the inverted pendulum type vehicle 100 may be configured to execute the function of the moving body control device 200 in response to receiving the disaster notification from the event notification device 300. Further, in this case, the inverted pendulum type vehicle 100 may be configured to recognize the situation around the own vehicle by wireless communication with another inverted pendulum type vehicle 100.

In the above embodiment, the case where the moving body control system 1 performs evacuation guidance in the park by controlling the inverted pendulum type vehicle 100 in an amusement park, a theme park, or the like has been described, but the evacuation guidance realized by the moving body control system 1 is not necessarily limited to that in an amusement park, a theme park, or the like. The moving body control system 1 may also be applied to evacuation guidance in a hospital, a factory, or the like, for example.

The embodiments described above may be expressed as follows.

A moving body control vehicle includes:
a storage device that stores a program; and
a hardware processor, and by executing the program by the hardware processor, the moving body control vehicle performs:
performing a moving body control process that controls a moving body maintained in a first state or a second state that is more stable than the first state by a balance control mechanism;
detecting an occurrence of a predetermined event; and
in the moving body control process, stopping the moving body from traveling and causing the moving body to change to the second state regardless of a driving operation of the moving body by an occupant of the moving body in a case where the occurrence of the predetermined event is detected.

Although the modes for implementing the disclosure have been described above using the embodiments, the disclosure is not limited to these embodiments, and various modifications and replacements may be made without departing from the gist of the disclosure.

What is claimed is:

1. A moving body control device comprising:
a hardware processor configured to:
control a moving body maintained in a first state or a second state that is more stable than the first state by a balance control mechanism;
detect an occurrence of a predetermined event;
stop the moving body temporarily from traveling and causes the moving body to change to the second state while the moving body is stopped; and
disable a driving operation of the moving body by an occupant of the moving body in a case where the hardware processor has detected the occurrence of the predetermined event.

2. The moving body control device according to claim 1, wherein the hardware processor is configured to determine the deceleration of stopping the moving body according to a tilting state of the occupant in the case where the hardware processor has detected the occurrence of the predetermined event.

3. The moving body control device according to claim 1, wherein the hardware processor is configured to determine a speed of a state change when a state of the moving body is changed to the second state according to a tilting state of the occupant in the case where the hardware processor has detected the occurrence of the predetermined event.

4. The moving body control device according to claim 2, wherein the hardware processor is configured to determine a speed of a state change when a state of the moving body is changed to the second state according to the tilting state of the occupant in the case where the hardware processor has detected the occurrence of the predetermined event.

5. The moving body control device according to claim 1, wherein the hardware processor is configured to recognize a surrounding environment of the moving body, and moves the moving body to an end of a road or a place other than the road by automatic driving in a case where the occupant has got off the moving body.

6. The moving body control device according to claim 2, wherein the hardware processor is configured to recognize a surrounding environment of the moving body, and moves the moving body to an end of a road or a place other than the road by automatic driving in a case where the occupant has got off the moving body.

7. The moving body control device according to claim 3, wherein the hardware processor is configured to recognize a surrounding environment of the moving body, and moves the moving body to an end of a road or a place other than the road by automatic driving in a case where the occupant has got off the moving body.

8. The moving body control device according to claim 4, wherein the hardware processor is configured to recognize a surrounding environment of the moving body, and moves the moving body to an end of a road or a place other than the road by automatic driving in a case where the occupant has got off the moving body.

9. The moving body control device according to claim 1, wherein the hardware processor is further configured to recognize an evacuation instruction related to the predetermined event, and
make the moving body automatically move to an evacuation site according to the evacuation instruction in a case where the hardware processor has detected the evacuation instruction after detecting the occurrence of the predetermined event and the occupant is on board the moving body.

10. The moving body control device according to claim 2, wherein the hardware processor is further configured to detect an evacuation instruction related to the predetermined event, and
make the moving body automatically move to an evacuation site according to the evacuation instruction in a case where the hardware processor has detected the evacuation instruction after detecting the occurrence of the predetermined event and the occupant is on board the moving body.

11. The moving body control device according to claim 3, wherein the hardware processor is further configured to detect an evacuation instruction related to the predetermined event, and
make the moving body automatically move to an evacuation site according to the evacuation instruction in a case where the hardware processor has detected the evacuation instruction after detecting the occurrence of the predetermined event and the occupant is on board the moving body.

12. The moving body control device according to claim 9, wherein the hardware processor is configured to determine a movement route to the evacuation site based on map information of a surrounding area including the evacuation site and position information of the moving body.

13. The moving body control device according to claim 12, wherein the hardware processor is configured to estimate a congestion degree in a surrounding environment based on position information of other moving bodies other than the moving body, and determine the movement route based on the congestion degree on a route from a current position to the evacuation site.

14. The moving body control device according to claim 9, wherein the hardware processor is configured to determine a movement route to the evacuation site, including a place that is impassable in normal times when the predetermined event does not occur.

15. The moving body control device according to claim 1, wherein the hardware processor is configured to detect an obstacle on a traveling road, and, in a case where an obstacle is detected on a traveling route, change a state of the moving body to the second state when the moving body passes through a place where the obstacle is detected.

16. The moving body control device according to claim 1, wherein the moving body further comprises an indicator which is a sign, a meter, a display, a pointer, or an index that notifies information to a periphery, and
the hardware processor is configured to notify the periphery of the moving body by the indicator that the moving body is performing automatic movement.

17. The moving body control device according to claim 1, wherein the moving body further comprises a support part capable of controlling a landing state and a takeoff state and maintaining an inverted state of the moving body in the landing state, and
The hardware processor is configured to set a state in which the support part has taken off as the first state, and the state in which the support part has landed as the second state.

18. The moving body control device according to claim 1, wherein in the second state, the hardware processor is configured to cause the balance control mechanism to ignore the driving operation of the occupant less than or equal to a predetermined amount, or makes a gain of a balance control by the balance control mechanism smaller than a gain in the first state.

19. A moving body control method performed by a hardware processor of a computer, the method comprising:
controlling a moving body maintained in a first state or a second state that is more stable than the first state by a balance control mechanism;
detecting an occurrence of a predetermined event;
stopping the moving body temporarily from traveling and causing the moving body to change to the second state while the moving body is stopped; and
disabling a driving operation of the moving body by an occupant of the moving body in a case where the hardware processor has detected the occurrence of the predetermined event is detected.

20. A non-transient computer-readable recording medium, recording a program which causes a hardware processor of a computer to perform:
controlling a moving body maintained in a first state or a second state that is more stable than the first state by a balance control mechanism;
detecting an occurrence of a predetermined event;
stopping the moving body temporarily from traveling and causing the moving body to change to the second state while the moving body is stopped; and
disabling a driving operation of the moving body by an occupant of the moving body in a case where the occurrence of the predetermined event is detected.

* * * * *